United States Patent
Chen

(10) Patent No.: US 9,530,589 B2
(45) Date of Patent: Dec. 27, 2016

(54) KEY BOARD OF MOBILE PHONE

(75) Inventor: Wei Chen, Guangdong (CN)

(73) Assignee: Huizhou TCL Mobile Communication Co. Ltd., Huizhou (CN)

( * ) Notice: Subject to any disclaimer, the term of this patent is extended or adjusted under 35 U.S.C. 154(b) by 375 days.

(21) Appl. No.: 13/393,957

(22) PCT Filed: Jun. 25, 2010

(86) PCT No.: PCT/CN2010/074518
§ 371 (c)(1),
(2), (4) Date: Mar. 2, 2012

(87) PCT Pub. No.: WO2011/038599
PCT Pub. Date: Apr. 7, 2011

(65) Prior Publication Data
US 2012/0165079 A1    Jun. 28, 2012

(30) Foreign Application Priority Data
Sep. 29, 2009    (CN) .......................... 2009 1 0190510

(51) Int. Cl.
| | |
|---|---|
| H01H 1/10 | (2006.01) |
| H01H 13/79 | (2006.01) |
| H04M 1/23 | (2006.01) |
| H01H 1/027 | (2006.01) |

(52) U.S. Cl.
CPC .............. *H01H 13/79* (2013.01); *H04M 1/23* (2013.01); *H01H 1/027* (2013.01); *H01H 2203/00* (2013.01); *H01H 2203/02* (2013.01); *H01H 2203/038* (2013.01); *H01H 2221/066* (2013.01); *H01H 2231/022* (2013.01)

(58) Field of Classification Search
CPC ................ H01H 2203/02; H01H 13/79; H01H 2203/038; H01H 2231/022
USPC .......................................... 200/513, 516, 504
See application file for complete search history.

(56) References Cited

U.S. PATENT DOCUMENTS

| | | | | |
|---|---|---|---|---|
| 4,652,704 | A  * | 3/1987 | Franklin | 200/275 |
| 5,278,557 | A  * | 1/1994 | Stokes et al. | 200/520 |
| 7,050,045 | B2 * | 5/2006 | Baker et al. | 341/34 |
| 8,421,480 | B2 * | 4/2013 | Ando | 324/649 |

* cited by examiner

*Primary Examiner* — Felix O Figueroa
(74) *Attorney, Agent, or Firm* — Che-Yang Chen; Law offices of Scott Warmuth

(57) ABSTRACT

A key board of mobile phone applied in key circuit of mobile phone is provided. A first electrode, a second electrode and a third electrode are disposed on a printed circuit board (PCB), the second electrode is disposed around the first electrode in circular form, tooth profile structures disposed matched with the third electrode are extended from an outer side of the second electrode, the third electrode is connected with the first electrode, the setting can be applied to various types of keys. The key board of the mobile phone can not only be applied to the dome keys, but also the carbon granule keys. If customers need different designs of keys, the new keys are needed to be redesign, and a new main board is not necessary to design, which greatly saves development time and lowers the cost.

6 Claims, 3 Drawing Sheets

KEY BOARD OF MOBILE PHONE

CROSS-REFERENCE TO RELATED APPLICATION

This application claims the benefit of China Patent Application No. 200910190510.9, filed on Sep. 29, 2009, in the State Intellectual Property Office of the People's Republic of China, the disclosure of which is incorporated herein in its entirety by reference.

BACKGROUND OF THE INVENTION

1. Field of the Invention

This invention relates to a mobile phone key apparatus, particularly relates to an improvement of a mobile phone key structure.

2. Description of the Related Art

With the development of communication technology and the improvement of people's life, mobile phone has become very important in their life.

Presently, ordinary mobile phones generally employ dome key which is formed by affixing dome (metal dome) to the printed circuit board (PCB). As shown in FIG. 1, the dome key comprises a PCB 110, a metal sheet (not shown in drawings), an electrode 120 and another electrode 130 setting in the PCB 110. The function of keys is achieved by connecting the electrodes through deformation of dome while pressing keys. The lifetime of dome key can be over one million clicks, and the dome key has little impact on the appearance of mobile phone. Due to the stroke of the dome is 0.3 mm, the keys can be ultra-thin with various designs, such as PC-rubber, PC-film, rubber, but the cost is high.

According to different consumer groups, the styles and types of mobile phones are different and accordingly the main boards applied are different. In prior art, the key boards are unitarily designed and cannot meet the requirements of different customers. For example, some customers need circuit board with dome keys, meanwhile want to use the same type of circuit board with low cost keys, in prior art a new template of main board is required to be designed, which will take more time on development. Thus, the main boards of mobile phones are not compatible, that causes great inconvenience to the production. Therefore, the prior art need to be improved.

SUMMARY OF THE INVENTION

To overcome the above mentioned deficiencies in prior art, this invention provides a key board of mobile phone, which is compatible with different types of keys, including the ultra-low-end ones and ordinary ones, which saves the development time and lowers the production cost.

The technical solutions of the present invention are as below:

A key board of mobile phone applied in key circuit of mobile phone, comprises a printed circuit board (PCB), characterized in that a first electrode, a second electrode and a third electrode are disposed on the PCB, the second electrode is disposed around the first electrode in circular form, tooth profile structures matched with the third electrode are extended from an outer side of the second electrode, the third electrode is connected with the first electrode, the setting can be applied to various types of keys.

Preferably, the first electrode and the second electrode are disposed in concentric circles.

Preferably, the second electrode is disposed around the first electrode in oval form.

Preferably, the second electrode and the first electrode are circular in shape with cutting edges.

Preferably, the centers of the first electrode, the second electrode and the third electrode coincide.

This invention provides a key board of mobile phones, wherein a first electrode, a second electrode and a third electrode are disposed on the PCB, the second electrode is disposed around the first electrode and also can be circular, tooth profile structures matched with the third electrode are extended from an outer side of the second electrode, the third electrode is connected with the first electrode. This setting can be applied to various types of keys, such as dome keys (high cost) and carbon granule keys (low cost). If customers need different designs of keys, the new keys are needed to be redesign, and a new main board is not necessary to be redesign, which greatly saves development time and lowers the cost.

DETAILED DESCRIPTION OF THE PREFERRED EMBODIMENTS

The present invention provides a key board of mobile phone. To make the technical solutions of the present invention more comprehensible, the present invention is described in detail with reference to the accompanying drawings and embodiments as follows.

Figure 1:
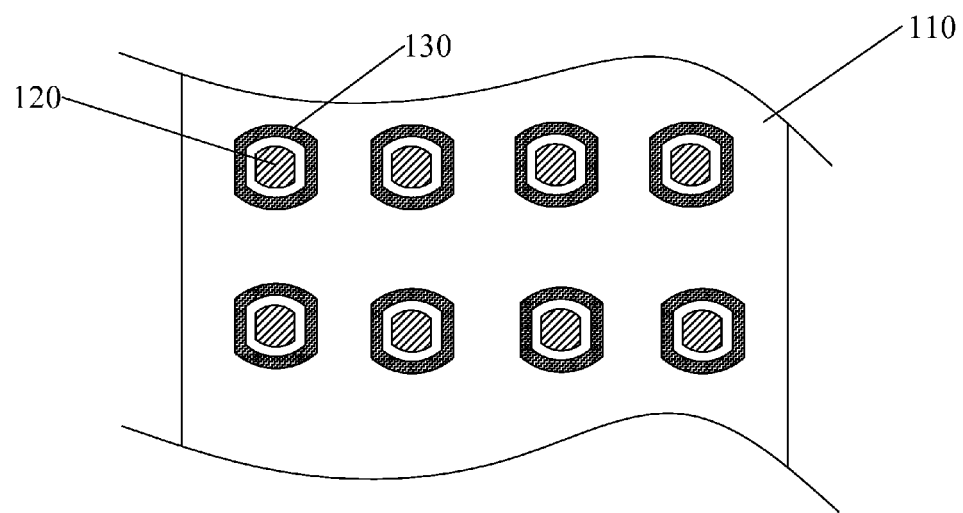
FIG. 1 is the structural schematic diagram of the key board in prior art.
Figure 2:
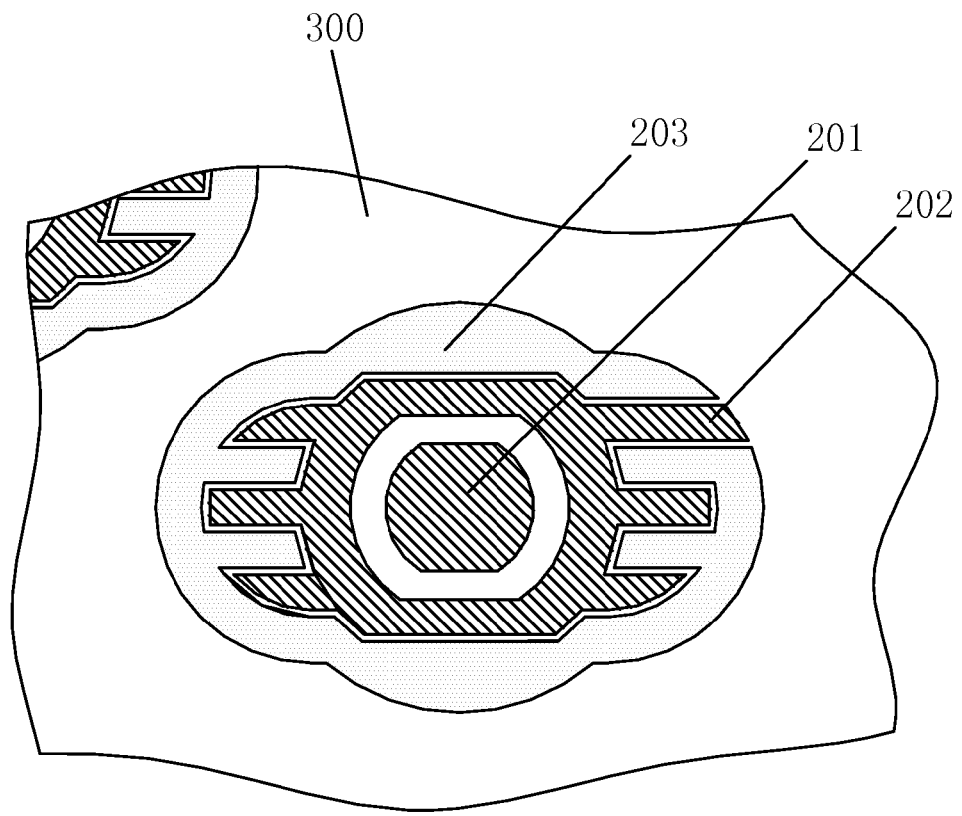
FIG. 2 is the structural schematic diagram of the key board provided in the embodiment of this invention.

As shown in FIG. 2, a key board of mobile phone mainly used in mobile phone circuit as provided in the embodiment of this invention comprises a printed circuit board (PCB) 300. A first electrode 201, a second electrode 202 and a third electrode 203 are disposed on the PCB 300. The first electrode 201 can be a solid conductive circle, the second electrode 202 is disposed around the first electrode 201 in circular form, the first electrode 201 and second electrode 202 is connected through a metal dome.

For example, a dome is fixed to the first electrode 201 and second electrode 202, and mobile phone keyboard is disposed on the dome, the common keyboard can be a PC-rubber (rubber key) or a PC-film (film key). When users press the key, the first electrode 201 and second electrode 202 are connected by deformation of the metal dome, then the corresponding functions of the key is achieved by a microprocessor. With the connection of electrodes through deformation of dome, the lifetime of key is over one million clicks, due to the stroke of the dome is 0.3 mm, the keys can be ultra-thin with various designs.

In order to make the key board of one type of mobile phone compatible with various keys, and meet the different requirements from customers. This invention provides an improvement to the electrodes on the main board of mobile phone. A plurality of tooth profile structures are disposed in the extension of the second electrode 202, the third electrode 203 is cross-matched with the tooth profile structures in the second electrode 202, and the first electrode 201 and the third electrode 203 are connected. This setting can be applied to various types of keys. For example, some customers need circuit board with dome keys, meanwhile want to use the same type of circuit board with low cost keys, in prior art a new template of main board is required to be designed, which will take more time on development. In this invention, carbon granules are affixed to the first electrode 201, the second electrode 202 and third electrode 203, which will directly lower the cost, electrodes can be connected wherever the carbon granules are disposed, that makes a key board of mobile phone compatible with the metal dome keys and carbon granule keys. Therefore, a new board is not necessary to be redesign for the carbon granule keys, which saves much development time. What's more, the design of carbon granule keys is not applied by any other companies, so it is a breakthrough in the field of mobile phone keys.

Therefore, both the metal dome keys (with high cost) and the carbon granule keys (with low cost) can be applied in this invention, which meet the different requirements of customers. The compatible key board with three electrodes makes the main board of one type of mobile phone compatible with the metal dome keys and the carbon granule keys. If customers need different designs of keys, we just need to deign new keys, and a new main board is not necessary to be redesign, which greatly saves development time and lowers the cost.

Wherein, the first electrode 201 may be circular, oval or circular in shape with cutting edges, the second electrode 202 is disposed around the first electrode 201 and also can be circular, oval or circular in shape with cutting edges, tooth profile structures are disposed in the extension of the second electrode 202, the third electrode 203 is cross-matched with the tooth profile structures in the second electrode 202, that makes the assembly of carbon granules easy. In the preferred embodiment in this invention, for convenience of the layout of hardware of circuit board, the first electrode 201 and the second electrode 202 are disposed in a circular form with two cutting edges as shown in FIG. 2. The electrodes in this invention can be in other shapes such as a rectangle with fillets or other irregular shapes. To assure the overall appearance in this invention, the shape of the second electrode is matched with the shape of the first electrode.

In a further embodiment, the center of the first electrode 201 is coincided with the center of the circular ring of the second electrode 202, the center of the third electrode 203 also can be coincided with the center of the first electrode 201 and the second electrode 202. For example, when the first electrode 201 is a circular electrode, the second electrode 202 and the first electrode 201 forms a concentric circles structure.

Figure 3:
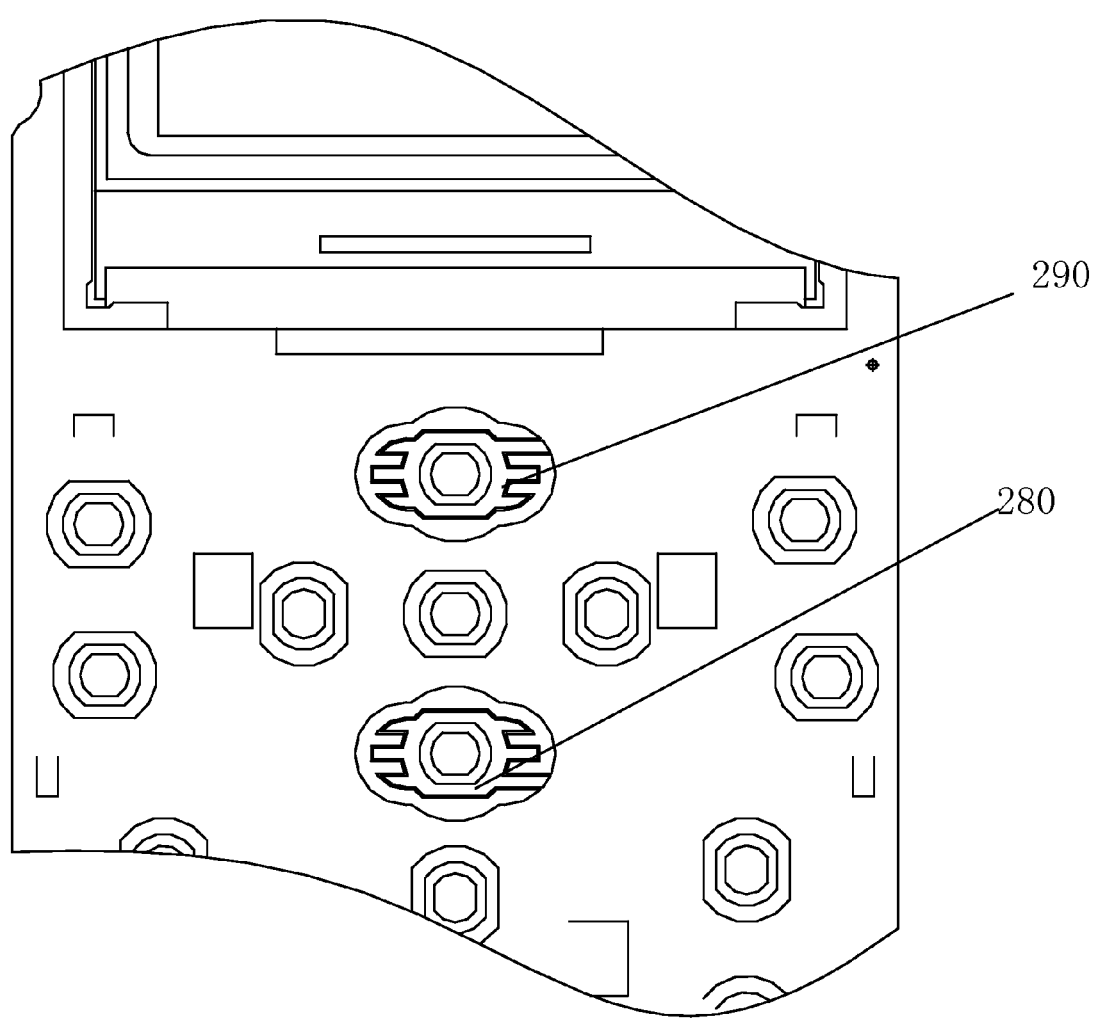
FIG. 3 is the partial schematic diagram of U2 mobile phone provided in the embodiment of this invention.

In a further embodiment, as shown in FIG. 3, the U2 model of mobile phone main board from Huizhou TCL Mobile Communication Co., Ltd. applies four-layer design. Due to the layout of hardware, compatibility design is applied in the upper navigation key 290 and lower navigation key 280 in U2 mobile phone. Both dome key and carbon granule key can be applied in the upper and lower navigation keys that demonstrate the mobile phone compatible with different types of keys.

This invention provides a key board of mobile phones, wherein a first electrode, a second electrode and a third electrode are disposed on the PCB, the second electrode is disposed around the first electrode in a circular form, tooth profile structures matched with the third electrode are extended from an outer side of the second electrode, the third electrode is connected with the first electrode. This setting can be applied to various types of keys, such as dome keys (high cost) and carbon granule keys (low cost). If customers need different designs of keys, only the new keys are needed to be redesign, and there is a new main board is not necessary to be redesign, which greatly saves development time and lowers the cost. The key board provided in this invention can be applied to remote controller of TV, air conditioner and some other high-end electrical products, not just limited to mobile phones.

The invention may be embodied in other specific form without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A key board of mobile phone applied in key circuit of the mobile phone, comprising:
   a printed circuit board (PCB);
   a first electrode having a pair of circular edges with two oppositely and parallelly disposed straight edges connecting the pair of circular edges;
   a second electrode having a hollow circular shape with an inner side having a shape corresponding to an outer periphery of the first electrode and an outer periphery with a plurality of tooth profile structures extending away from the first electrode and in a direction substantially parallel to the straight edges of the first electrode; and
   a third electrode substantially enclosing the second electrode with one of the tooth profile structures thereof exposed;
   wherein the first electrode, the second electrode and the third electrode are concentrically disposed on the PCB, the second electrode is disposed between the first electrode and the third electrode without exposing the first electrode to the third electrode.

2. The key board of mobile phone of the claim 1, wherein the second electrode is disposed around the first electrode in oval form.

3. The key board of mobile phone of the claim 1, wherein the first electrode is a solid conductive circle with the straight edges.

4. The key board of mobile phone of the claim 2, wherein the first electrode is a solid conductive circle with the straight edges.

5. The key board of mobile phone of the claim 1, wherein centers of the first electrode, the second electrode and the third electrode coincide.

6. The key board of mobile phone of the claim 2, wherein centers of the first electrode, the second electrode and the third electrode coincide.

* * * * *